UNITED STATES PATENT OFFICE.

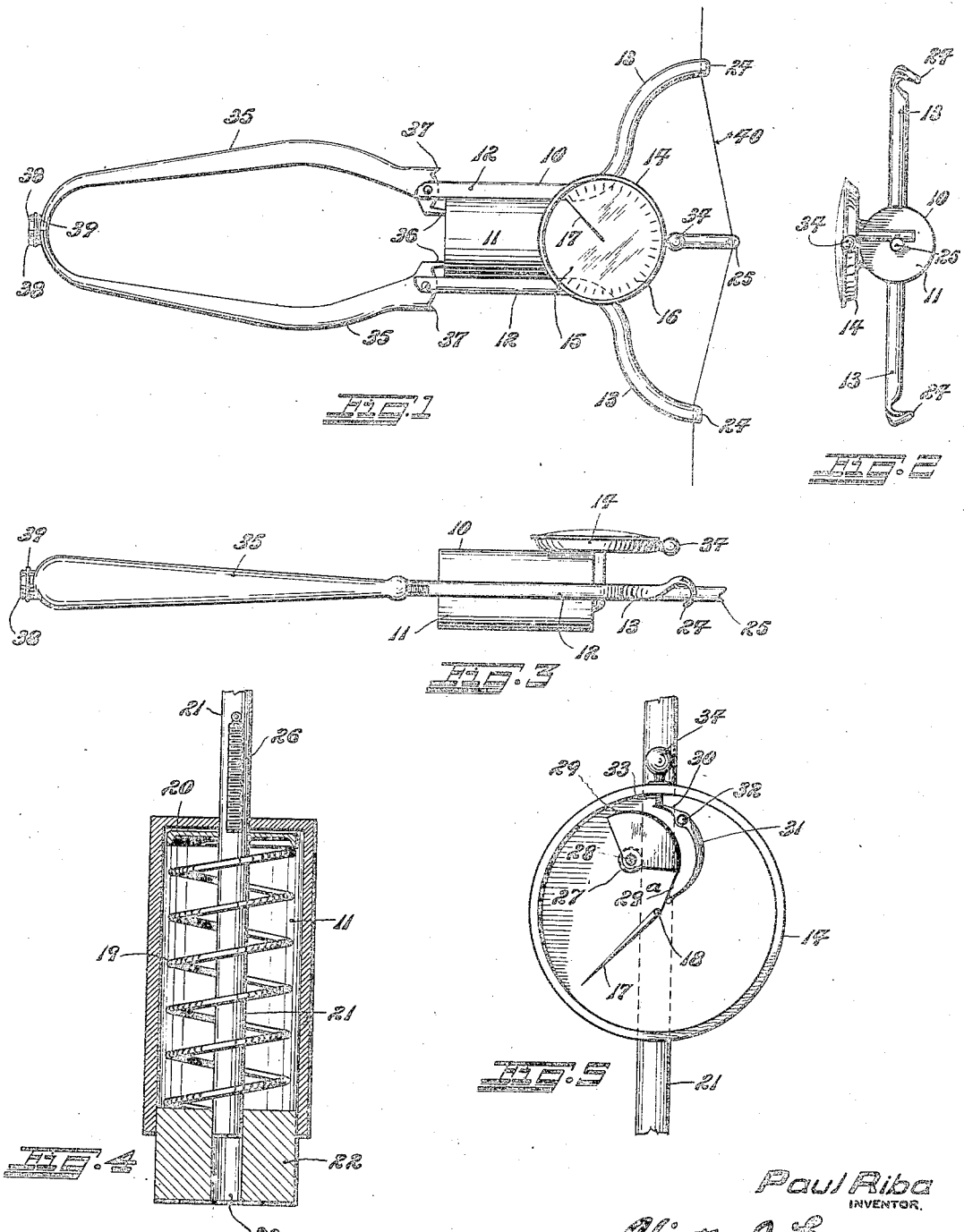

PAUL RIBA, OF PHILADELPHIA, PENNSYLVANIA.

TENSIOMETER.

1,380,251. Specification of Letters Patent. Patented May 31, 1921.

Application filed May 7, 1920. Serial No. 379,602.

*To all whom it may concern:*

Be it known that I, PAUL RIBA, a citizen of Republic of Brazil, residing at Philadelphia, in the county of Philadelphia and State of Pennsylvania, have invented new and useful Improvements in Tensiometers, of which the following is a specification.

The invention relates to devices for testing the tensile strength of wires and the like and has for an object to provide a simple apparatus for readily and effectively determining the tension to which the wire can be subjected.

The invention comprehends among other features an apparatus which is preferably manually operated and which is particularly adaptable in testing the wires employed in connection with airplane construction and in which it is necessary that each wire be carefully tested to determine its factor of safety as to the tensile strength thereof prior to the application of the wire to the work in hand.

In the further disclosure of the invention reference is to be had to the accompanying drawings constituting a part of this invention, in which similar characters of reference denote corresponding parts in all the views, and in which,—

Figure 1— is a plan view of the device.

Fig. 2— is an end view.

Fig. 3— is a plan view.

Fig. 4— is a fragmentary enlarged sectional view taken through the spring and plunger casing, and Fig. 5— is an enlarged view looking into the interior of the dial or indicator showing the interior mechanism thereof.

Referring more particularly to the views, the numeral 10 indicates a frame which preferably comprises a casing or cylinder 11 open at one end and a plurality of frame members 12, rigidly secured to the sides of the casing and terminating in forwardly extending relatively diverging arms 13. Secured in any convenient manner to the frame is an indicator 14 comprising a dial 15 provided with suitable scale indications 16 and a rotary pointer 17, carried on a suitable pivot pin 18 secured within the indicator. Located within the casing 11 is an expansible helical spring 19 suitably seated at one end in a seat 20 disposed in the closed end of the cylinder, a sliding plunger 21 being provided to extend through the casing and be encircled by the spring with one end of the spring abutting against a sliding block 22 and the free end of the plunger 21 also arranged to slide in an opening 23 in the block, the said plunger carrying the seat 20. The forward end of the plunger 21 extends beyond the ends of the arms 13 and which on their free ends are formed into hooks 24 and the free end of the forwardly extending portion of the plunger is notched as at 25. Suitably secured in any convenient manner to the plunger or to the seat 20 as the case may be, is a rack 26 which meshes with a pinion 27 carried on a pin 28 arranged in the indicator and which has secured thereto a segment 29 to which is attached a flat spring 29 having connection with a pivot pin 18 of the pointer 17. An adjusting member 30 for the pointer comprising a crescent shaped adjusting arm 31 pivoted on a pin 32 having one end bearing against the spring 29 and the other end engaged by the inner end of an adjusting screw 33 having a suitable exterior operating knob 34.

The inner ends of the arms 12 have mounted to swing thereon a plurality of handles 35 and the inner ends of which terminate in off-set projections 36 which engage the outer end of the sliding block 22, as shown in Fig. 1. Stop lugs or projections 37 are also formed on the inner ends of the handles to engage the side bars 12 and limit the swinging action of the handles. The outer ends of the handles 35 are each provided with a knob or projection 38 and a band or ring 39, is adapted to be applied to the knobs or projections 38 and encircle the same to bind the outer ends of the handles together.

In the use of the device described, when it is desired to determine whether a wire 30, can be subjected to a certain tension, the hooks on the free ends of the arms 12 are suitably hooked over the wire with the wire passing through the notch 25 in the forward end of the plunger 21. This application of the device to the wire will cause the plunger to retract or move backward, thus moving the seat 20 and the accompanying spring and block rearwardly in the casing. The handles 35 are now swung toward each other, causing the feet 36 to bear against the block 22 and move it forwardly in the casing, thus compressing the spring and tending to move the seat 20 and plunger 21 forwardly. This action will cause the rack 26 to actuate the pinion 27 thus actuating the segment 29 and causing the pointer 17 to operate over the graduations 16 on the dial 15. The handles are now locked together by the ring 39 and it will be apparent that the wire having been placed under tension, when the compensating action between the tension of the wire and the compression of the spring 19 equalize, that a reading can be taken on the dial after the wire has settled or lost the vibrations which it might have been subjected to in the application of the apparatus to the wire.

From the foregoing description it will be seen that the device described is of comparatively simple formation in its construction and arrangement of its parts and that the same can be operated with but very little skill necessary on the part of the operator and it will be clearly understood that the device can be applied to various forms and kinds of wires although as mentioned heretofore the device is particularly adapted to wires such as are used in airplane construction and in the use of which it is desired to definitely determine the tension to which such wires can be subjected.

Having described my invention, I claim—

1. A tensiometer comprising a frame including wire engaging arms and a casing carried thereby, an indicating dial on the casing, a centrally disposed wire engaging plunger passing through the casing, a seat carried by the plunger, a spring disposed in the casing and bearing against the seat, a sliding block in the casing and engaged by the spring, handles mounted to swing on the frame, off-set projections on the handles for engagement with the block to advance the same in the casing when the handles are actuated and means for locking said handles against relative movement.

2. A tensiometer comprising a frame including wire engaging arms, a casing on the frame, an indicator on the casing, a wire indicating spring actuated plunger mounted to slide in the casing, means for actuating said plunger relative to the wire which it engages, a pointer movably carried on the indicator to operate over the dial thereof, a rack on the plunger, means connecting the pointer with the rack, for the operation of the former when the plunger is operated, an adjusting mechanism carried by the indicator and constituting a part thereof, for the adjustment of the pointer independent of any movement thereof by the action of the plunger.

In testimony whereof I affix my signature.

PAUL RIBA.